June 3, 1952  G. F. SALERNO ET AL  2,599,487
DEVICE FOR LOADING ARTICLES INTO CONTAINERS
Filed April 20, 1948  2 SHEETS—SHEET 1
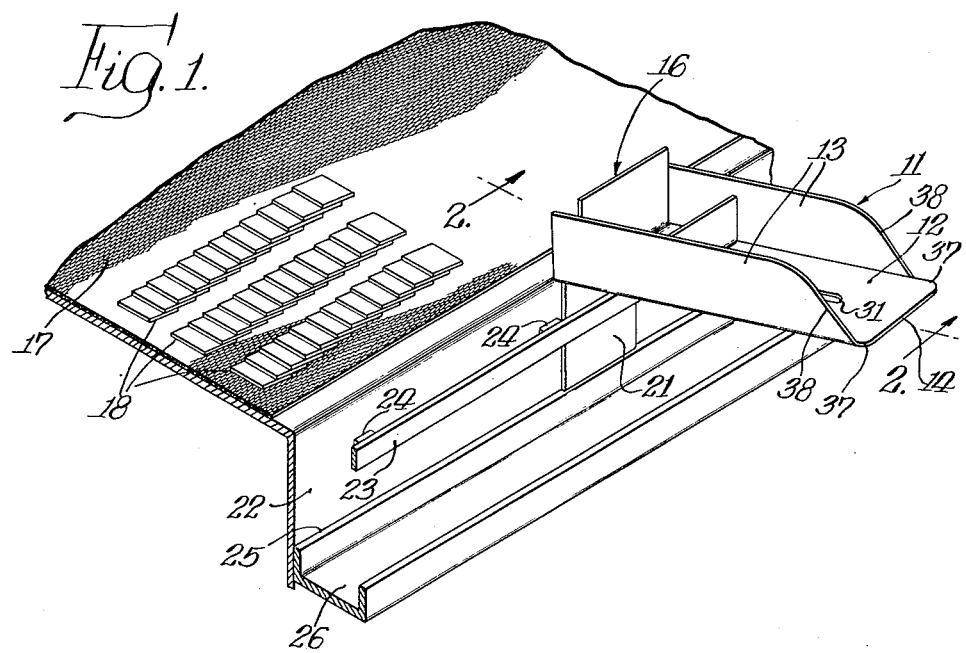
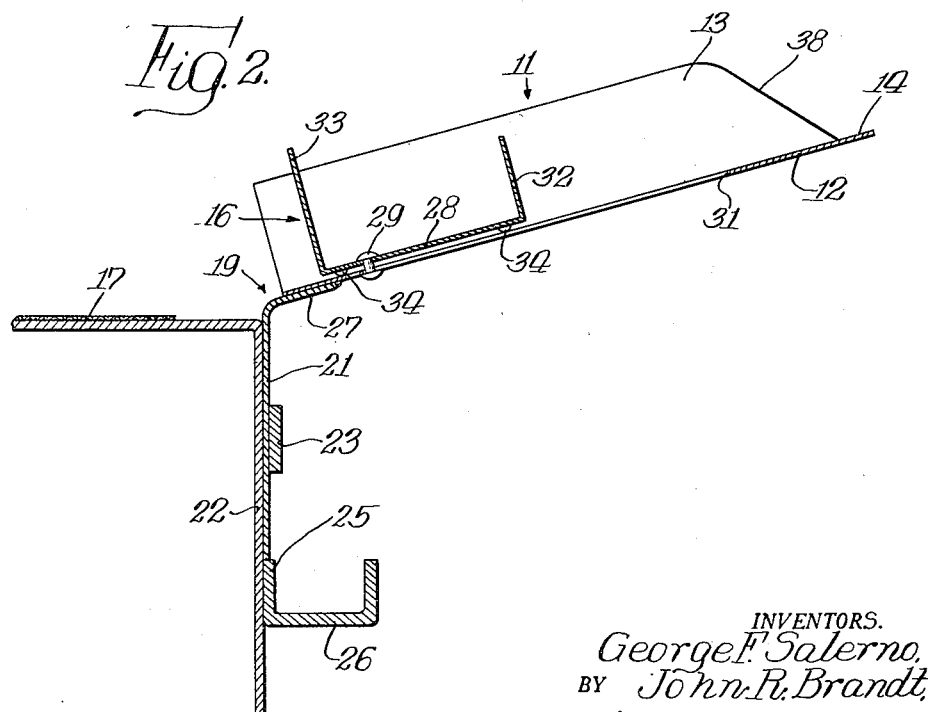
INVENTORS.
George F. Salerno,
BY John R. Brandt,

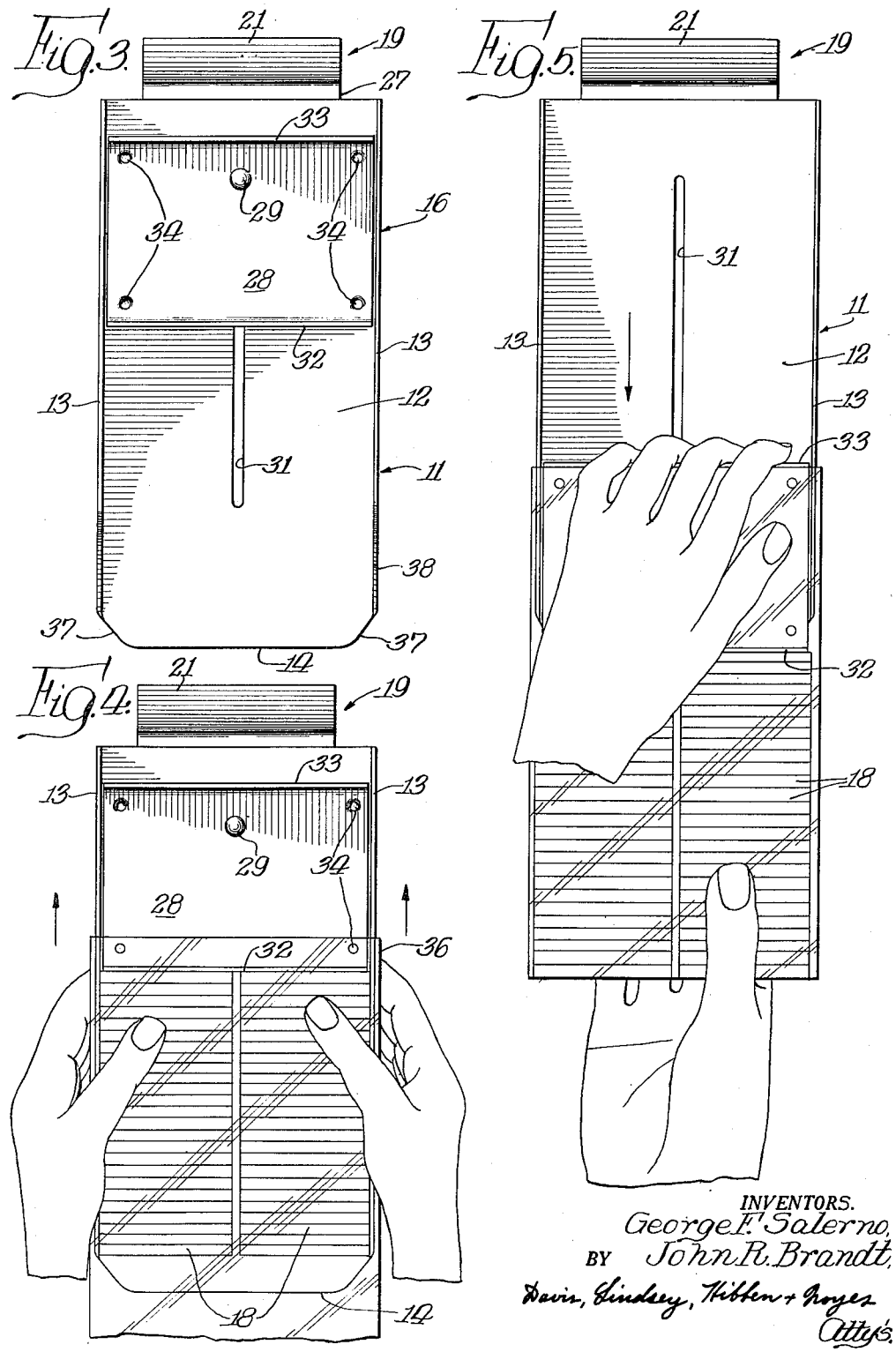

Patented June 3, 1952

2,599,487

UNITED STATES PATENT OFFICE 2,599,487

DEVICE FOR LOADING ARTICLES INTO CONTAINERS

George F. Salerno, Wilmette, and John R. Brandt, Chicago, Ill., assignors to Salerno Machinery Company, Chicago, Ill., a corporation of Illinois Application April 20, 1948, Serial No. 22,188

2 Claims. (Cl. 226—18)

This invention relates to loading and packaging devices and more particularly to a device for loading containers with small flat articles, such as cookies, crackers and other like goods.

In the manufacture of many types of relatively small flat articles, including baked products and confectionery items such as cookies, crackers, wafers, etc., it is highly desirable that there be provided an efficient and simple technique for loading such products into bags, boxes or other types of containers. This requirement is particularly critical under conditions of mass production and is especially acute when, because of the nature of the product or for sales purposes, it is desired to load the articles in carefully stacked or aligned condition thereby avoiding random dumping or filling of the containers. One prevalent type of packaging comprises the use of transparent containers, such as cellophane bags, in which case careful filling of such containers with the articles in stacked alignment produces a more attractively packaged product having enhanced sales appeal.

Heretofore, in the usual continuous method for manufacturing in mass lots products of the above described type, the finished cookies or other articles were transported by a conveying system, such as a belt conveyor, to a predetermined loading point where the necessary packaging operations were carried out largely by manual techniques. For example, as the moving conveyor carried the cookies to the loading point, packaging operators removed the cookies by hand in relatively small batches and attempted to stack the same in rows in open containers such as transparent bags. However, such strictly manual loading operations were tedious and inefficient, entailed excessive handling of the product by the packaging operators, and often resulted in high losses of the product through breakage.

In such manual operations, some operators attempted to align two rows of cookies side by side in a bag by dropping them in through the open top thereof, it being necessary to insert one row at a time. However, such alignment was not always maintained as the cookies frequently assumed a jumbled and helter-skelter arrangement, and also, because of their fragile nature, the cookies were broken by the impact of falling. It was thereafter necessary to empty the bag and to start the process over again or to remove the broken cookies so as not to detract from the appearance of the bag. Other operators placed the bags on their sides and attempted to insert a batch of cookies from the open end in a substantially horizontal direction. This required the operator to insert his hand within the bag with the result that a relatively large percentage of the bags became torn or wrinkled. Moreover, by this latter method the cookies failed to remain in standing position and fell over from face to face alignment before the next batch of cookies could be inserted therein.

Hence the manual loading of cookies and crackers by such tedious and cumbersome methods greatly restricted the output of a modern baking plant since the operators were unable to maintain a loading rate commensurate with the speed of production of modern baking machines.

Accordingly, it is a primary object of the present invention to provide a device of the character described for use in filling containers with aligned articles which is efficient and simple to operate and which eliminates the many objections inherent in the loading methods previously employed.

A further object of the invention is to provide a loading device for filling containers with a plurality of aligned articles, such as cookies and crackers, by means of which the loading may be accomplished quickly and with relatively few manual operations whereby excessive handling of the articles by the packaging operator is avoided.

Another object of the invention is to provide a loading device for filling bags or similar containers with rows of aligned articles, such as crackers or cookies, by means of which the opportunities for breakage of the articles and tearing or disfiguration of the bags are greatly minimized.

Still another object of the invention is to provide a loading device of the character described which may be readily and adjustably mounted in close proximity to a conveyor system and in an inclined direction with respect thereto, thus permitting the articles to be rapidly removed from the conveyor and stacked in alignment prior to insertion within the container.

An additional object of the invention is to provide a loading device of the character described having a stationary receptacle adapted to receive a plurality of aligned articles, such as cookies or crackers, and to extend into a container which may be slipped over said receptacle and a movable ejector for discharging the articles in place in the container.

A further object of the invention is to provide a loading device of the character described having a loading receptacle and a spacer-ejector member cooperating therewith, said receptacle being adapted to insert a plurality of articles into a container in aligned arrangement and said spacer-ejector member functioning to assist removal of the loaded container from the device and to leave a predetermined free space at the top of the container to permit sealing or closure thereof after completion of the loading operation.

Other objects and advantages of the invention will become evident from the subsequent detailed description of the invention and the accompanying drawings, in which:

Figure 1 is a perspective view of one specific form of the loading device comprising the present invention and showing the mounting of the device adjacent a cookie conveyor;

Fig. 2 is a longitudinal sectional view through the center of the loading device and a portion of the conveyor, taken on the line 2—2 in Fig. 1;

Fig. 3 is a top plan view of the loading device shown in Figs. 1 and 2;

Fig. 4 is a plan view similar to Fig. 3 and showing a quantity of cookies in alignment in the receptacle with the ejector member in retracted position and a transparent bag being slipped over the lower portion of the device for loading purposes; and Fig. 5 is a plan view similar to Fig. 4 but showing the ejector member being manipulated to discharge the loaded container from the receptacle.

In general, the loading device of my invention comprises a stationary member and a cooperating movable member. The stationary member functions as an elongated loading receptacle adapted to be mounted in an inclined direction for receiving and holding a quantity of articles in aligned condition, and the movable member constitutes an article ejector slidably mounted in said receptacle and adapted to be moved reciprocably away from and toward the outlet end thereof for receiving articles and displacing the same.

Referring now to the drawings, Fig 1 illustrates one form of the loading device of the present invention, shown merely by way of example as mounted for use in cooperation with a horizontal belt conveyor and disposed at right angles thereto. The loading device comprises an elongated stationary loading trough or receptacle 11 having a flat bottom or slideway 12, upright retaining side walls 13, and an open outer end portion 14. Slidably secured to the bottom 12 is a movable ejector member indicated generally at 16 and hereinafter described in greater detail.

A horizontal belt conveyor 17, moving in the direction indicated by the arrow, is shown in Fig. 1 in the process of transporting a plurality of small flat cookies 18 arranged thereon in parallel rows with the individual cookies disposed in overlapping relationship in each row so they may be readily picked up in aligned batches by an operator standing alongside the conveyor 17 and adjacent the loading device. The receptacle 11 is mounted adjacent the belt conveyor 17, extending outwardly and upwardly therefrom, by means of an obtuse angular bracket 19 (Fig. 2) having a depending leg 21, which is received in a socket structure formed on an upright portion or wall 22 of a supporting structure for the belt conveyor 17. This socket structure comprises an elongated bar 23 attached to the side of the wall 22 and spaced therefrom by a plurality of blocks 24, and the leg 21 of the bracket 19 extends vertically between the wall 22 and the bar 23 and is supported at its lower end by the upturned edge 25 of a channel member 26. As will be apparent from Fig. 1, the location of the loading device may be changed along the length of the belt conveyor 17 merely by lifting the bracket arm 21 upwardly from its support and reinserting the same at any desired loading point along the belt.

As seen more clearly in Fig. 2, the loading receptacle 11 is fastened at the rear end of its flat bottom 12, remote from the open end portion 14, to a forwardly and upwardly inclined, projecting leg 27 of the bracket 19, the loading device thereby being supported in an inclined position. Hence, the flat bottom 12 of the receptacle 11 is slightly elevated from the horizontal at the open end portion 14 and slopes downwardly and rearwardly therefrom for purposes hereinafter described.

The ejector member 16 has a generally U-shaped longitudinal cross-section (Fig. 2) and comprises a bottom portion 28 slidably connected to the bottom 12 by means of a pin or rivet 29 slidably received within a longitudinal slot 31 in the flat bottom 12. The respective ends of the slot 31 terminate at points removed from the ends of the bottom wall 12 so that movement of the ejector 16 is limited to the length of the slot. Extending upwardly on each side of the bottom portion 28, between the upstanding sides 13 of the receptacle 11, are longitudinally spaced front and rear transverse walls 32 and 33, respectively, the front wall 32 being of lesser height than the rear wall 33. A plurality of depending protuberances 34 are provided on the under surface of the bottom portion 28 of the ejector member 16 for sliding engagement with the upper surface of the receptacle wall 12 to facilitate longitudinal sliding movement of the member 16 along the flat wall or slideway 12 of the loading receptacle 11.

In the operation of the device, the ejector member 16 is first disposed at the rear of the loading receptacle 11, with the pin 29 engaging the rear end of the slot 31 thereby providing loading space between the forward wall 32 of the member 16 and the open end portion 14 of the receptacle 11. The packaging operator by inserting his left hand under one of the cookies 18 on the moving belt, causes the overlapping cookies (Fig. 1) to stand on edge and then by using both hands he removes from the belt a stack or row containing the desired quantity of cookies in face-to-face alignment. He then manually transports the removed stack or row to a point over the loading device and lays them in the receptacle 11 against the bottom wall 12 and against one upright side wall 13 thereof, the outer face of the cookie at one end of the row engaging the face of the front transverse wall 32 of the ejector 16. This operation is again repeated by the operator until two such rows of aligned cookies 18 are laid side-by-side in the loading receptacle 11, as shown in Fig. 4. Because of the slight incline of the receptacle 11, no difficulty is experienced in retaining the cookies upright in face-to-face alignment thereon, each of the two rows being supported by the flat bottom 12, the transverse wall 32 and the side walls 13.

At this point the operator then slips the mouth of a transparent bag or container 36 over the projecting loading device containing the rows of aligned cookies, as shown clearly in Fig. 4, until the upper portion of the bag 36 has passed over the front ejector wall 32. Because the bag 36 is slipped over the device, it is imperative that it be free and unobstructed at its outer unsupported end. Since the forward corners 37 of the bottom wall 12 are rounded and the forward portions 38 of the receptacle side walls 13 are inclined and also rounded, the likelihood of tearing the bag when it is pulled up over the loading device is eliminated. When the bag has thus been applied, it is unnecessary for the operator to hold bag on the loader due to the inclination thereof and the operator may thus readily change the positions of his hands from the Fig. 4 positions to the Fig. 5 positions in preparation for the final loading operation.

As shown in Fig. 5, the operator, in order to effect the final loading of the cookies 18 in proper position within the container 36, grasps the rear operating wall 33 with one hand and moves the ejector member 16 forwardly in the receptacle 11 toward the open end portion 14 thereof. The front wall 32 of the member 16, being in engagement with the cookies 18, moves the two rows of cookies in aligned condition into the bag or container 36 which is supported at the bottom thereof by the operator's other hand. As the ejector 16 is moved, the lower front wall 32 thereof also moves inwardly within the container 36 forcing the two rows of cookies ahead of it, the cookies sliding upwardly over the receptacle bottom wall 12 and remaining in upright aligned position at all times because of the inclination of the wall 12.

The front cookie-engaging wall 32 of the ejector 16 is of such restricted height as to pass readily within the bag 36, but the rear transverse wall 33, which may be grasped by the operator's hand as the actuating element, projects above the side walls 13 of the receptacle so as to be of greater height than the bag opening. Because of the greater height of its rear wall 33 the ejector 16 may be readily grasped by the operator and the rear wall is prevented from entering the bag as it abuts against the mouth thereof.

When the two rows of cookies have been fully inserted within the bag 36 so that the cookies are in engagement with the bottom thereof, the operator may then pull the upper end of the bag away from the loading device after which the upper end of the bag may be sealed by various means. The bag 36 is readily removed without tearing or puncturing due to the rounded and inclined portions 37 and 38 of the receptacle 11, and upon removal the cookies will be found to be in two properly aligned rows and every one of such cookies will be in perfect, whole condition.

Where the bag 36 is not slipped up over the receptacle 11 an extreme distance the lower end thereof will project outwardly away from the open end 14 of the receptacle so as to be in overhanging relationship. Thus, when the operator rapidly moves the ejector 16 so as to force the rows of cookies into the bag, the weight of the cookies on the unsupported, overhanging portion of the bag will cause it to pull off from the receptacle of its own accord and when this operation is carried out rapidly the loaded bag will slip off into the operator's hand almost immediately as the ejector reaches its extreme upward position.

In addition to functioning as a reciprocable ejector for displacing articles from the loading receptacle, the member 16 also functions as a spacer because of the longitudinally spaced location of the walls 32 and 33 along the bottom 12 of the receptacle 11. It will be seen that when the member 16 is in retracted position (Fig. 2) only the space between the front wall 32 and the open end portion 14 may be filled with cookies or other articles for loading. However, when the bag 36 is slipped over the loading device (Fig. 4), the aligned cookies are thereby disposed in the lower portion of the container, the forward wall 32 of the member 16 extending downwardly some distance into the container. Thereafter, when the member 16 is withdrawn by removal of the loaded bag 36, a free or unoccupied space remains in the top portion thereof. This free top space is desirable, especially in the case of cellophane bags, in order to permit the top portion of the bag 36 to be folded down for sealing purposes or for the fastening of a heavy paper or cardboard piece as an auxiliary seal and by which the unit may be handled.

Although the invention has been described primarily in connection with a single specific embodiment, it is intended that various modifications and equivalents thereof be included within the scope of the invention as defined in the appended claims.

We claim:

1. A loading device for loading a plurality of aligned articles into containers, said device comprising an elongated loading receptacle provided with a bottom, a pair of upstanding side walls, and an open end portion, said bottom having a longitudinal slot terminating inwardly from the opposite ends of said bottom, means on said receptacle for mounting the same in transverse outwardly extending and inclined relation adjacent an elongated article conveyor with said open end portion in elevated position relative to the conveyor and said bottom sloping downwardly and rearwardly toward the conveyor for retaining articles in alignment in said receptacle, a movable ejector member slidably disposed in reciprocable relation in said receptacle, said member having an upright portion disposed transversely between said upstanding side walls and adapted to engage articles in said receptacle for supporting the same in inclined aligned position and for discharging the same upon sliding movement of said member toward said open end portion, said member also having a bottom portion provided with a plurality of protuberances slidably engaging the bottom of said receptacle on opposite sides of said slot, and a retainer pin affixed to said bottom portion of said ejector member and extending through said slot in the receptacle bottom whereby the extent of sliding movement of said ejector member is limited by engagement of said pin with the ends of the slot, said ejector member being free of rearwardly projecting structure and being retained within the longitudinal confines of said receptacle when the ejector member is in its rearwardmost retracted position whereby to avoid interfering engagement of the ejector member with the adjacent conveyor.

2. A loading device for loading a plurality of aligned articles into a bag, said device comprising an elongated channel-shaped open ended receptacle having a bottom and upstanding sides, means secured adjacent one end of said receptacle for mounting the device in inclined outwardly extending position with the opposite end of the receptacle in elevated position and the bottom thereof sloping downwardly to said one end thereof, said receptacle being substantially free of external projections whereby to permit insertion of the open mouth portion of a bag over said opposite end of said receptacle with the bag in substantially close conformation to the receptacle, a generally U-shaped ejector member movably disposed in said receptacle for reciprocating movement longitudinally therein, said ejector member having a substantially flat bottom portion and a pair of forward and rear upright walls extending transversely between the upstanding sides of said reueptacle and spaced longitudinally therein, and connecting means slidably interconnecting said receptacle and said ejector member for limited sliding movement of the latter, said connecting means being disposed within the longitudinal confines of said receptacle in all positions of said ejector member, said forward wall of said ejector member being adapted to engage aligned articles disposed in said receptacle and to discharge the same from said receptacle upon movement of said ejector member toward said opposite end of said receptacle and said forward wall being of lesser height than the sides of said receptacle whereby to permit insertion of said forward wall into the bag during a loading operation, and said rear wall of said ejector member being of greater height than the sides of said receptacle whereby to abut the mouth of the bag and to prevent complete entry of the ejector member into the bag, the longitudinally spaced relation of said walls thereby providing an unfilled space of predetermined size at the top portion of the bag.

GEORGE F. SALERNO.
JOHN R. BRANDT.

REFERENCES CITED

The following references are of record in the file of this patent:

UNITED STATES PATENTS

| Number | Name | Date |
|---|---|---|
| 1,335,221 | Christensen | Mar. 30, 1920 |
| 1,492,178 | Nicholas | Apr. 29, 1924 |
| 1,759,357 | Lacey | May 20, 1930 |
| 1,917,571 | Becker | July 11, 1933 |
| 2,031,264 | Kennebeck | Feb. 18, 1936 |
| 2,268,692 | Bisset | Jan. 6, 1942 |
| 2,476,475 | Baum | July 19, 1949 |
| 2,523,829 | Hubbell | Sept. 26, 1950 |